(12) United States Patent
Kitamura et al.

(10) Patent No.: US 9,006,974 B2
(45) Date of Patent: Apr. 14, 2015

(54) SWITCHING POWER SUPPLY APPARATUS AND LUMINAIRE

(75) Inventors: Noriyuki Kitamura, Kanagawa-ken (JP); Yuji Takahashi, Kanagawa-ken (JP); Hitoshi Kawano, Kanagawa-ken (JP); Masatoshi Kumagai, Kanagawa-ken (JP); Yosuke Saito, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 268 days.

(21) Appl. No.: 13/608,315

(22) Filed: Sep. 10, 2012

(65) Prior Publication Data

US 2013/0119860 A1    May 16, 2013

(30) Foreign Application Priority Data

Nov. 15, 2011   (JP) .................................. 2011-249832

(51) Int. Cl.
    *H05B 37/02*   (2006.01)
    *H05B 33/08*   (2006.01)
(52) U.S. Cl.
    CPC ................................ *H05B 33/0803* (2013.01)
(58) Field of Classification Search
    None
    See application file for complete search history.

(56) References Cited

U.S. PATENT DOCUMENTS

| 2005/0207165 A1 | 9/2005 | Shimizu et al. |
| 2006/0152085 A1* | 7/2006 | Flett et al. .................. 307/75 |
| 2008/0123340 A1 | 5/2008 | McClellan |
| 2010/0134047 A1 | 6/2010 | Hasnain |
| 2011/0285312 A1* | 11/2011 | Choutov et al. ............ 315/291 |

FOREIGN PATENT DOCUMENTS

JP    2011-119237    6/2011

OTHER PUBLICATIONS

European Search Report issued in corresponding European Patent Application No. 12183707.4 mailed Apr. 17, 2013.

* cited by examiner

*Primary Examiner* — Crystal L Hammond
(74) *Attorney, Agent, or Firm* — Banner & Witcoff, Ltd.

(57) ABSTRACT

A switching power supply apparatus according to an embodiment includes a switching element, an inductor, a drive circuit, a mounting substrate, and an insulating substrate. The switching element is connected between a power supply and a lighting load. The inductor is connected in series to the switching element. The drive circuit controls the switching element, converts a voltage supplied from the power supply, and is mounted on the mounting substrate. The insulating substrate is thermally connected to the switching element, and has thermal conductivity higher than the mounting substrate.

20 Claims, 8 Drawing Sheets

US 9,006,974 B2

SWITCHING POWER SUPPLY APPARATUS AND LUMINAIRE

CROSS-REFERENCE TO RELATED APPLICATIONS

This application is based upon and claims the benefit of priority from Japanese Patent Application No. 2011-249832, filed on Nov. 15, 2011; the entire contents of which are incorporated herein by reference.

FIELD

Embodiments described herein relates to a switching power supply apparatus and luminaire.

BACKGROUND

A switching power supply employing a switching element is widely used in various fields as a power supply suitable for power saving and downsizing. As an example, the switching power supply is used also as a power supply for illumination. In recent years, replacement of lighting sources from incandescent lamps or fluorescent lamp to energy saving and long life light sources such as a light-emitting diode (LED) is in progress. Also, for example, new lighting sources such as Organic light-emitting diode (OLED) are also developed.

However, heat generation density of the switching element or the like is increased if the switching power supply is increased in frequency and downsized.

DETAILED DESCRIPTION

Figure 1A:
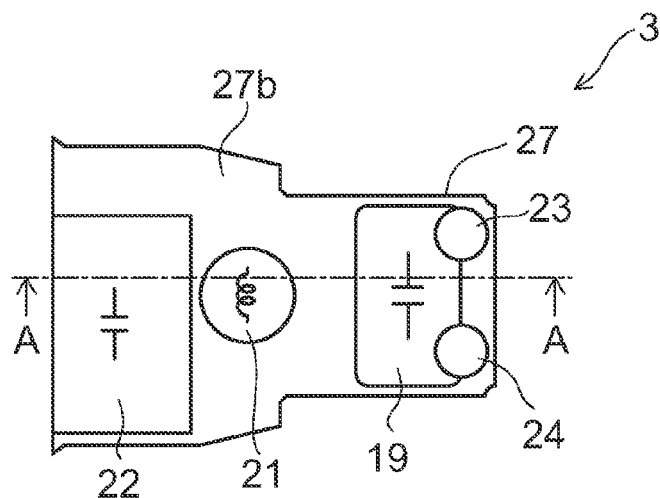
FIG. 1A is a schematic top view illustrating a switching power supply apparatus according to a first embodiment.

In general, according to one embodiment, a switching power supply apparatus includes a switching element, an inductor, a drive circuit, a mounting substrate, and an insulating substrate. The switching element is connected between a power supply and a lighting load. The inductor is connected in series to the switching element. The drive circuit controls the switching element, converts a voltage supplied from the power supply, and is mounted on the mounting substrate. The insulating substrate is thermally connected to the switching element, and has thermal conductivity higher than the mounting substrate.

Referring now to the drawings, an embodiment will be described in detail. The drawings are schematic and conceptual only, and the relationship between the shape and the width of the respective portions and the ratios of the sizes among the components are not necessarily the same as those in reality. Even the identical component may be illustrated differently in sizes and ratios with respect to each other. In this specification of the application and respective drawings, the same components as those described relating to already presented in the drawings are designated by the same reference numerals and detailed description will be omitted as needed.

A first embodiment will be described.

Figure 1B:
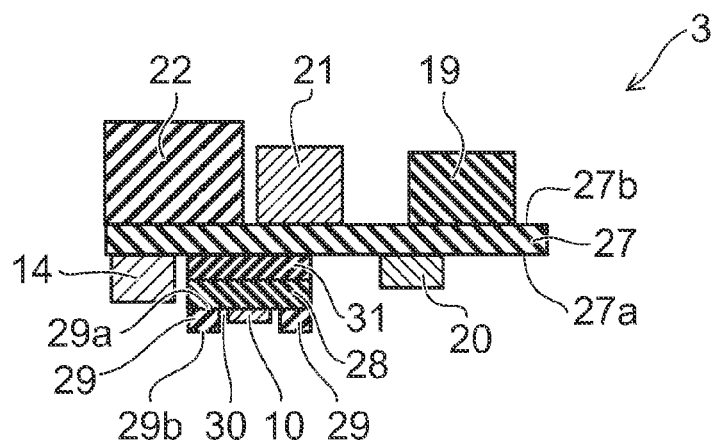
FIG. 1B is a schematic cross-sectional view taken along the line A-A in FIG. 1A and FIG. 1C.
Figure 1C:
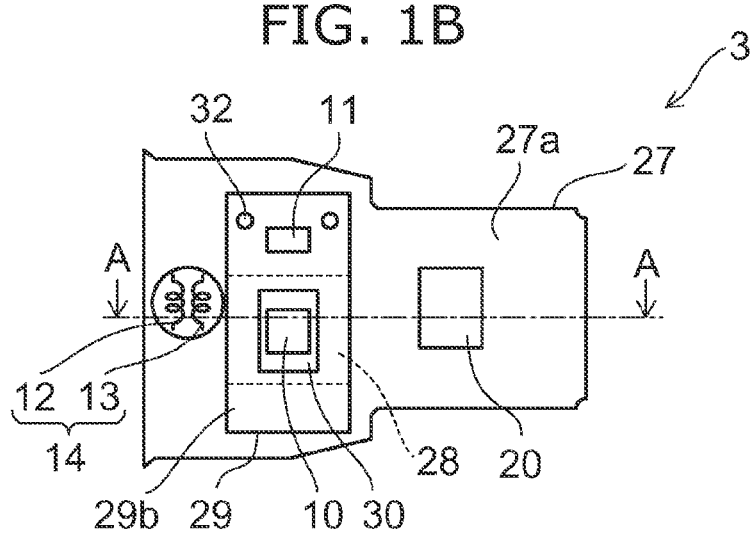
FIG. 1C is a schematic bottom view.

FIG. 1A is a schematic top view illustrating a switching power supply apparatus according to a first embodiment, FIG. 1B is a schematic cross-sectional view of FIG. 1A and FIG. 1C taken along the line A-A, and FIG. 1C is a schematic bottom view.

As illustrated in FIG. 1A and FIG. 1B, a switching power supply apparatus 3 includes a relatively large-sized high elements such as an input capacitance 19, a choke coil 21, and a smoothing capacitor 22 mounted on the side of a second main surface 27b of a mounting substrate (main substrate) 27. The second main surface 27b is a component surface.

As illustrated in FIG. 1B and FIG. 1C, the switching power supply apparatus 3 includes an insulating substrate 28, a mounting substrate (child substrate) 29 including a semiconductor element 10 integrated with the switching elements and a drive circuit 11 mounted thereon, a transformer 14, and a rectifying circuit 20 on the side of a first main surface 27a of the mounting substrate 27. The mounting substrate 27 is, for example, a paper phenol substrate and, for example, a glass epoxy substrate. The first main surface 27a is a soldered surface and relatively low in height element is mounted thereon.

The insulating substrate 28 is a ceramic substrate containing, for example, aluminum oxide ($Al_2O_3$), for example, aluminum nitride (AlN). The insulating substrate 28 is high in thermal conductivity than the mounting substrates 27 and 29 and is thermally connected to the switching element. The insulating substrate 28 is mounted on a first main surface 29a side of the mounting substrate 29.

The mounting substrate 29 is, for example, a paper phenol substrate and, for example, a glass epoxy substrate. The mounting substrate 29 is provided with an opening portion 30, and the insulating substrate 28 is exposed from the opening portion 30. The semiconductor element 10 is mounted on the insulating substrate 28 in the opening portion 30. The drive circuit 11 is mounted on the side of a second main surface 29b of the mounting substrate 29 on the side opposite the first main surface 29a of the mounting substrate 29.

The insulating substrate 28 and the mounting substrate 29 are mounted on the side of the first main surface 27a of the mounting substrate 27 via an adhesive layer 31. The adhesive layer 31 is, for example, thermal cured resin. The mounting substrate 29 is electrically connected to the mounting substrate 27 via a via hole 32.

As described with reference to a circuit drawing in FIG. 3, the input capacitance 19, the rectifying circuit 20, the choke coil 21, and the smoothing capacitor 22 constitute an AC-DC converting circuit configured to rectify and smooth an AC voltage to be input to a pair of input terminals 23 and 24. The semiconductor element 10, the drive circuit 11, and the transformer 14 constitute a DC-DC converter configured to lower the voltage of the smoothing capacitor 22.

Figure 2A:
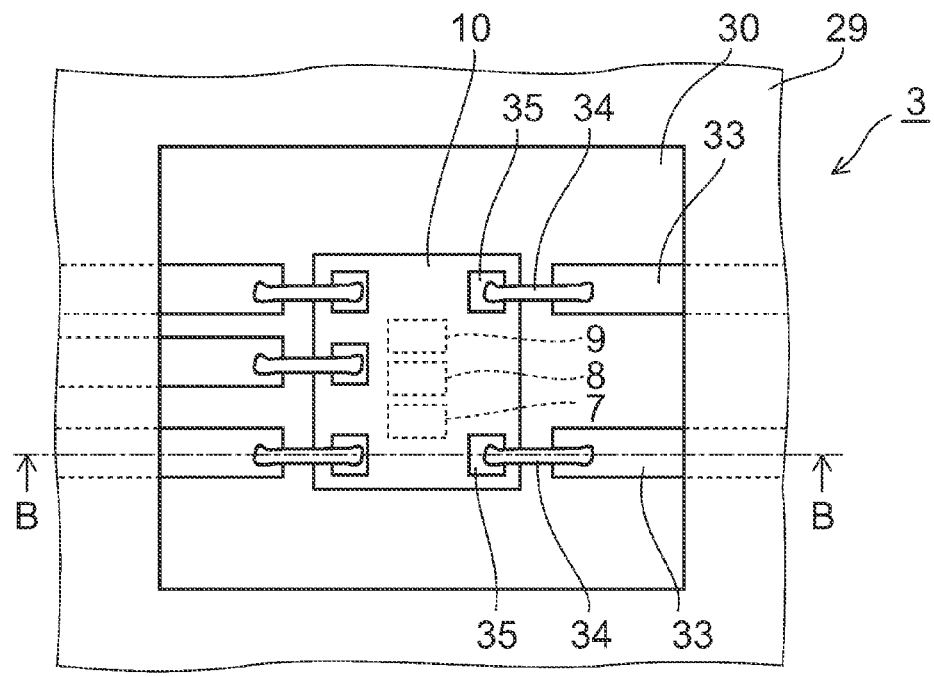
FIG. 2A is an enlarged plan view illustrating a portion in the vicinity of the switching power supply apparatus according to the first embodiment.
Figure 2B:
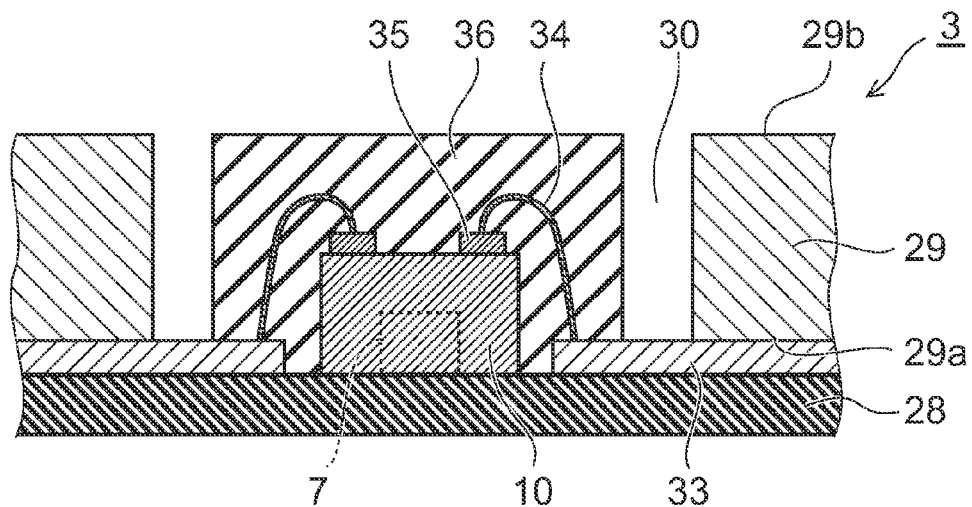
FIG. 2B is a cross-sectional view taken along the line B-B in FIG. 2A.

FIG. 2A is an enlarged plan view illustrating a portion in the vicinity of the switching power supply apparatus according to the first embodiment and FIG. 2B is a cross-sectional view taken along the line B-B of FIG. 2A.

In FIGS. 2A and 2B, a portion in the vicinity of the semiconductor element 10 including the switching element on the insulating substrate 28 and the mounting substrate 29 of the switching power supply apparatus 3 is illustrated in an enlarged scale.

The semiconductor element 10 is an element including a switching element 7, a constant-current element 8, and a rectifying element 9 integrated therein. The semiconductor element 10 is mounted as a bear chip on the mounting substrate 29. In other word, a pad 35 provided on the semiconductor element 10 and a wiring layer 33 provided on the mounting substrate 29 are electrically connected by a bonding wire 34. The switching element 7 integrated on the semiconductor element 10 is thermally connected to the insulating substrate 28.

A protective layer 36 is, for example, a resin layer, and protects the semiconductor element 10, the bonding wire 34 and the pad 35. In FIG. 1B, FIG. 1C and FIG. 2A, the protective layer 36 is omitted.

The switching element 7, the constant-current element 8, the rectifying element 9 may be mounted as bear chips respectively to the mounting substrate 29. In other words, electrodes on the respective bear chips of the switching element 7, the constant-current element 8, and the rectifying element 9 and the wiring layer 33 on the mounting substrate 29 may be electrically connected by bonding wires. Flip chip mounting may also be employed without using the bonding wires. Furthermore, the switching element 7, the constant-current element 8, and the rectifying element 9 may be enclosed respectively in a package, or the respective elements may be surface mounted. The same applies to other embodiment described later.

The switching element 7 and the constant-current element are, for example, High Electron Mobility Transistor transistors (HEMT) and, for example, are GaN system HEMT.

The DC-DC converter including the semiconductor element 10, the drive circuit 11, and the transformer 14 may have a high frequency on the order of, for example, 10 MHz, and the transformer 14 may be downsized. Consequently, the transformer 14 is capable of being mounted on the side of the first main surface 27a where relatively small-sized elements are mounted. The relatively large-sized elements such as the smoothing capacitor 22 are mounted on the second main surface 27b side opposite the first main surface 27a.

In this embodiment, the insulating substrate 28 thermally connected to the switching element 7 and having thermal conductivity higher than the mounting substrates 27 and 29 is provided. Consequently, thermal radiation of the switching element 7 is improved, and downsizing is enabled.

In this embodiment, a configuration in which the AC-DC converting circuit including the input capacitance 19, the rectifying circuit 20, the choke coil 21, and the smoothing capacitor 22 is mounted on the mounting substrate 27 is exemplified. However, the DC-DC converter may be configured by mounting the semiconductor element 10, the drive circuit 11, and the transformer 14 on the mounting substrate 27. In this case as well, since the insulating substrate 28 is thermally connected to the switching element 7, and has thermal conductivity higher than the mounting substrate 27, the thermal radiation is improved, and hence the downsizing is enabled. If the smoothing capacitor 22 is not mounted, the transformer 14 may be mounted on the side of the second main surface 27b of the mounting substrate 27. The same applies to other embodiment described later.

Figure 3:
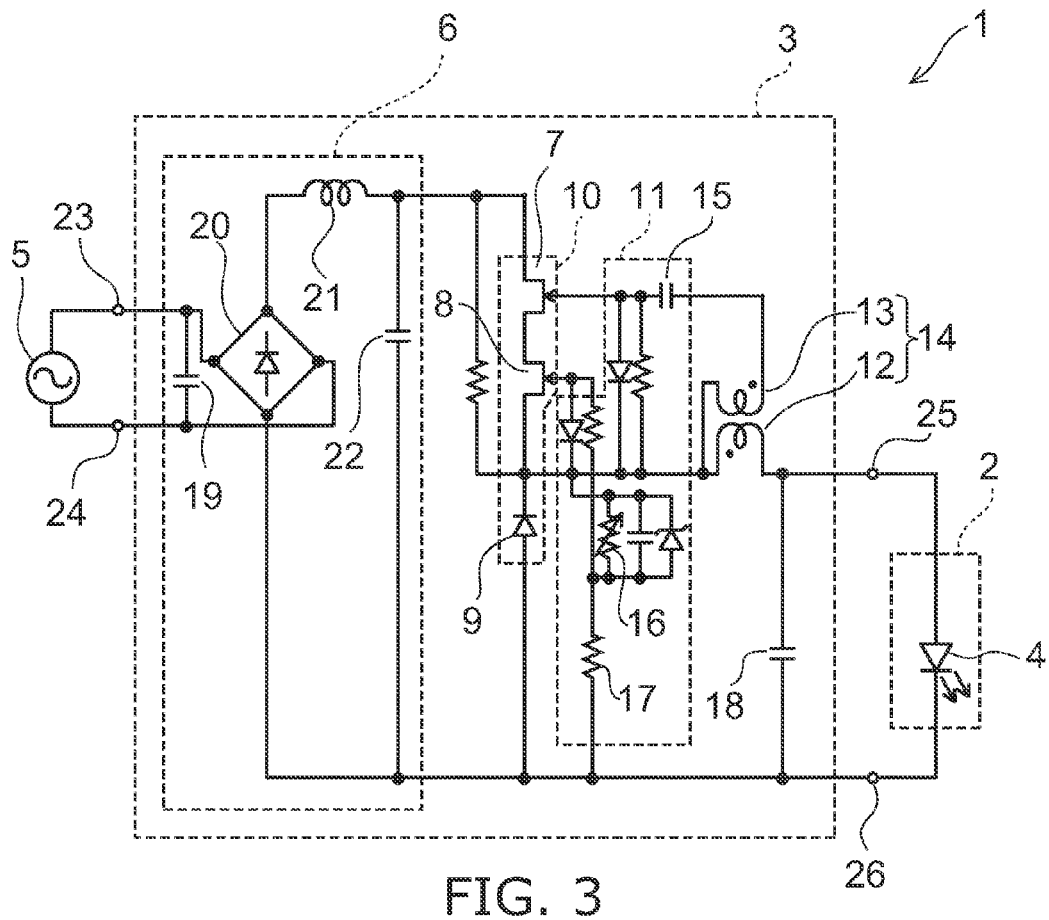
FIG. 3 is a circuit diagram illustrating a luminaire including the switching power supply apparatus according to the first embodiment.

FIG. 3 is a circuit diagram illustrating the luminaire including the switching power supply apparatus according to the first embodiment.

A luminaire 1 includes a lighting load 2 and a switching power supply apparatus 3. The lighting load 2 includes a lighting source 4 such as an LED, and is turned ON by receiving a supply of power from the switching power supply apparatus 3.

The switching power supply apparatus 3 includes an AC-DC converting circuit 6 configured to convert the AC voltage supplied from the AC power supply 5 to a DC voltage, a switching element 7, a constant-current element 8, a rectifying element 9, and the drive circuit 11 configured to control the switching element 7 and set a constant current value of the constant-current element 8. A portion of the switching power supply apparatus 3 except for the AC-DC converting circuit 6 constitutes the DC-DC converter.

The AC-DC converting circuit 6 includes the input capacitance 19, the rectifying circuit 20, the choke coil 21, and the smoothing capacitor 22. The input capacitance 19 is connected to a pair of the input terminals 23 and 24. The rectifying circuit 20 includes a diode bridge, and receives a supply of input of the AC voltage from the AC power supply 5 via the pair of input terminals 23 and 24. The DC voltage (pulsed voltage) output from the rectifying circuit 20 is smoothed by a low-pass filter including the choke coil 21 and the smoothing capacitor 22. The AC power supply 5 is, for example, a commercial power supply.

A drain of the switching element 7 is connected to one end (positive polarity side) of the smoothing capacitor 22, and a source of the switching element 7 is connected to a drain of the constant-current element 8. A gate of the switching element 7 is connected to one end of a feedback winding 13 via a coupling capacitor 15 of the drive circuit 11.

A source of the constant-current element 8 is connected to one end of an inductor 12 and the other end of the feedback winding 13, and a gate of the constant-current element 8 is connected to a connecting point between dividing resistances 16 and 17 of the drive circuit 11. A voltage of the smoothing capacitor 22 is supplied to the dividing resistances 16 and 17 via a bias resistance. Consequently, the gate of the constant-current element 8 receives a supply of a potential having a negative polarity with respect to the source of the constant-current element 8. The dividing resistance 16 is a variable resistance, and is capable of adjusting the constant current value of the constant-current element 8 by varying the resistance value of the dividing resistance 16.

The rectifying element 9 is connected between the source of the constant-current element 8 and the other end (negative polarity side) of the smoothing capacitor 22 with the direction from the other end of the smoothing capacitor 22 to the constant-current element 8 as the forward direction.

The other end of the inductor 12 is connected to a high-potential output terminal 25, and the other end of the smoothing capacitor 22 is connected to a low-potential output terminal 26. An output capacitance 18 is connected between the high-potential output terminal 25 and the low-potential output terminal 26.

The inductor 12 and the feedback winding 13 are magnetically coupled at a polarity which supplies a voltage having a negative polarity with respect to the source to the gate of the switching element 7 when an increasing current flows from one end to the other end of the inductor 12, that is, in the direction from the source of the constant-current element or the cathode of the rectifying element 9 toward the high-potential output terminal 25. Also, the inductor 12 and the feedback winding 13 constitute the transformer 14.

The switching element 7 and the constant-current element 8 are, for example, a GaN system HEMT, and are normally-on type elements. The switching element 7, the constant-current element 8 and the rectifying element 9 are integrated as the semiconductor element 10. A protecting diode is connected to the respective gates of the switching element 7 and the constant-current element 8. The coupling capacitor 15 connected to the respective gates of the switching element 7 and the constant-current element 8 and supplies a gate potential thereto, the dividing resistances 16 and 17, and the protecting diode constitute the drive circuit 11.

The lighting load 2 is connected between the high-potential output terminal 25 and the low-potential output terminal 26 in parallel to the output capacitor 18.

Subsequently, the operation of the switching power supply apparatus 3 will be described.

When a power supply voltage is supplied from the AC power supply 5, a DC voltage is generated at both ends of the smoothing capacitor 22.

When the DC voltage is generated at the both ends of the smoothing capacitor 22, both of the switching element 7 and the constant-current element 8, being the normally-on type elements, are in the ON state. Then, a current flows through a route of the switching element 7, the constant-current element 8, the inductor 12 and the output capacitance 18, and the output capacitance 18 is charged. Voltages at both ends of the output capacitor 18, that is, the voltage between the high-potential output terminal 25 and the low-potential output terminal 26 is supplied to the lighting source 4 of the lighting load 2 as the output voltage of the switching power supply apparatus 3.

When the output voltage reaches the predetermined voltage, the output current flows to the lighting source 4, and the lighting source 4 is turned ON. At this time, the current flows through the route of the switching element 7, the constant-current element 8, the inductor 12, the output capacitor 18 and the lighting source 4. For example, when the lighting source 4 is an LED, the predetermined voltage is a forward voltage of the LED, and is defined in accordance with the lighting source 4.

The current flowing through the inductor 12 increases with time, and an electromotive force of a polarity having a higher potential on the coupling capacitor 15 side is induced in the feedback winding 13. Therefore, a positive potential with respect to the source is supplied to the gate of the switching element 7 via the coupling capacitor 15, and the switching element 7 maintains the ON state.

When the current flowing through the constant-current element 8 exceeds the constant-current value, the voltage between the drain and the source of the constant-current element 8 abruptly increases. Therefore, the voltage between the gate and the source of the switching element 7 becomes lower than the threshold voltage and the switching element 7 is turned OFF. The constant voltage value is a saturated current value of the constant-current element 8, and is defined by the potential to be supplied from the dividing resistances 16 and 17 to the gate of the constant-current element 8. As described above, since the gate potential of the constant-current element 8 is a negative potential with respect to the source, the saturated current value is limited to an adequate value.

The inductor 12 continuously allows the current to flow through the route of the rectifying element 9, the output capacitor 18 and the lighting load 2, and the inductor 12. At this time, the inductor 12 discharges energy, so that the current of the inductor 12 is reduced. Therefore, an electromotive force of a polarity having a lower potential on the coupling capacitor 15 side is induced in the feedback winding 13. Therefore, a negative potential with respect to the source is supplied to the gate of the switching element 7 via the coupling capacitor 15, and the switching element 7 maintains the OFF state.

When the energy accumulated in the inductor 12 becomes zero, the current flowing in the inductor 12 becomes zero. The direction of the electromotive force induced by the feedback winding 13 is reversed again, and an electromotive force of a potential higher on the coupling capacitor 15 side is induced. Accordingly, a potential higher than the source is supplied to the gate of the switching element 7, and the switching element 7 is turned ON. Accordingly, a state in which the output voltage described above reaches the predetermined voltage.

From then onward, the above-described operation is repeated. Accordingly, the switching of the switching element 7 to ON and OFF is repeated automatically, and an output voltage lowered from the DC voltage obtained by smoothing the power supply voltage supplied from the AC power supply 5 is supplied to the lighting source 4. The current supplied to the lighting source 4 is limited to the constant current value by the constant-current element 8. Therefore, stable lighting of the lighting source 4 is ensured. As described above, the constant current value is adjustable by varying the value of resistance of the dividing resistance 16.

In the first embodiment, since the switching element 7 and the constant-current element 8 are GaN system HEMT, the switching frequency may be increased to, for example, approximately 10 MHz. Consequently, downsizing of the inductor 12 and the transformer 14 which constitutes the feedback winding 13 is achieved.

Thermal radiation is improved by thermally connecting the switching element 7 and the constant-current element 8 to the insulating substrate 28 higher in thermal conductivity than the mounting substrates 27 and 29 on which the circuit elements such as the drive circuit 11 are mounted. Consequently, the problem of increase of the heat generation density is avoided, so that the downsizing and accommodation in a sealed space are enabled.

In the first embodiment, a configuration in which the AC-DC converting circuit 6 is provided and the power supply voltage supplied from the AC power supply 5 is converted into the DC voltage, and the DC voltage is lowered by the DC-DC converter before being output is exemplified. However, a configuration in which the AC-DC converting circuit 6 is omitted and the DC voltage supplied from the DC power supply is lowered by the DC-DC converter before output is also applicable.

Subsequently, a second embodiment will be described.

Figure 4:
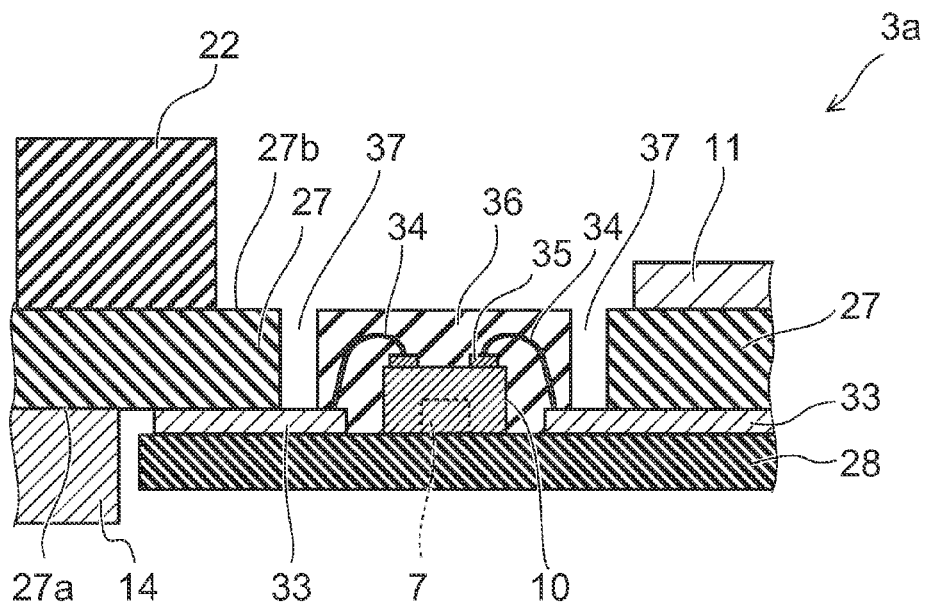
FIG. 4 is a cross-sectional view illustrating a switching power supply apparatus according to a second embodiment.

FIG. 4 is a cross-sectional view illustrating the switching power supply apparatus according to a second embodiment.

As illustrated in FIG. 4, the second embodiment is different from the first embodiment in the configuration of the mounting substrate 27 and in that the mounting substrate (child substrate) 29 is omitted. In other words, the mounting substrate 27 is provided with an opening portion 37. The insulating substrate 28 is mounted on the first main surface 27a of the mounting substrate 27, and is exposed in the opening portion 37. The semiconductor element 10 is mounted on the insulating substrate 28 in the opening portion 37. The drive circuit 11 is mounted on the second main surface 27b of the mounting substrate 27. Other points in the second embodiment is the same as those in the first embodiment, and a circuit configuration of a switching power supply apparatus 3a is also the same as that of the switching power supply apparatus 3.

In the second embodiment, since the mounting substrate 29 is not used, the structure is simplified and cost is reduced and, simultaneously, the mounting height may be lowered.

In the second embodiment, the insulating substrate 28 thermally connected to the switching element 7 and having thermal conductivity higher than the mounting substrate 27 is provided. Consequently, thermal radiation of the switching element 7 is improved, and downsizing is enabled.

In this embodiment as well, since the GaN system HEMT is used as the switching element 7, downsizing of the inductor 12 and the feedback winding 13 by increasing the frequency is enabled. Consequently, the transformer 14 including the inductor 12 and the feedback winding 13 may be mounted on the first main surface 27a side of the mounting substrate 27, that is, on the side of the solder surface, and further downsizing is enabled.

Subsequently, a third embodiment will be described.

Figure 5A:
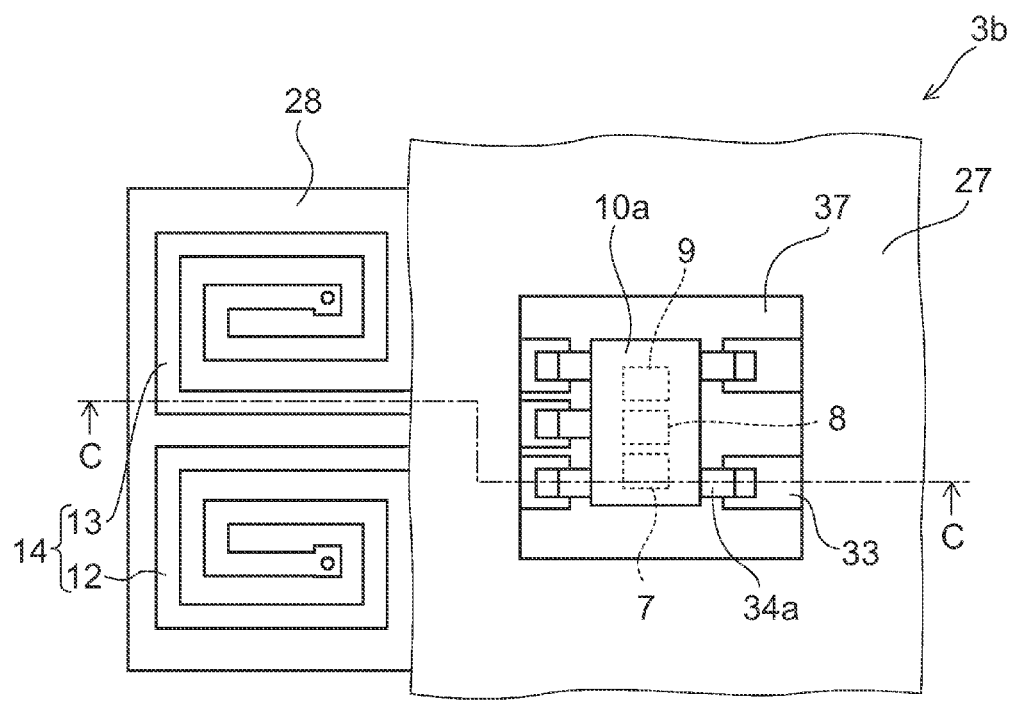
FIG. 5A is a schematic plan view illustrating a switching power supply apparatus according to a third embodiment.
Figure 5B:
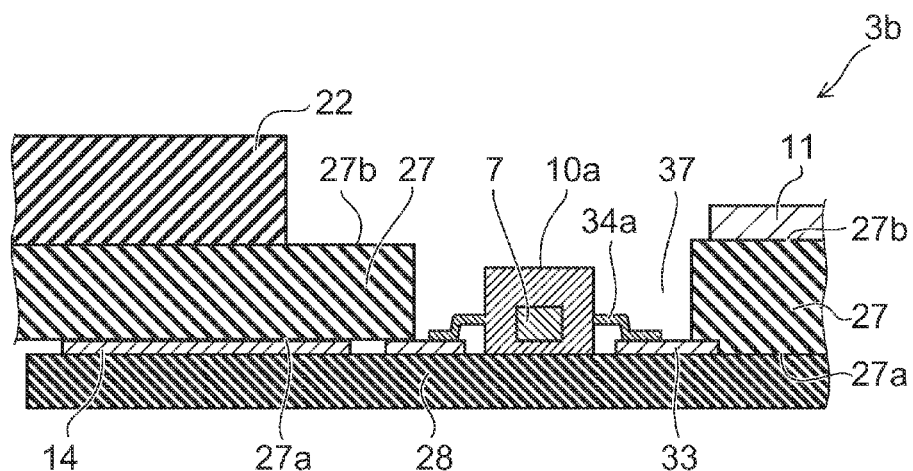
FIG. 5B is a schematic cross-sectional view taken along the line C-C in FIG. 5A.

FIG. 5A is a schematic plan view illustrating a switching power supply apparatus according to the third embodiment and FIG. 5B is a schematic cross-sectional view taken along the line C-C in FIG. 5A.

As illustrated in FIGS. 5A and 5B, the third embodiment is different from the second embodiment in the configurations of the semiconductor element 10 and the transformer 14. In other words, the semiconductor element 10 is enclosed in a package, and is surface mounted on the insulating substrate 28. The inductor 12 and the feedback winding 13 which constitute the transformer 14 are spiral inductors, and are formed on the insulating substrate 28.

In the third embodiment as well, since the GaN system HEMT is used as the switching element 7, the inductor 12 and the feedback winding 13 may be mounted on the insulating substrate 28 by the spiral inductor by increasing the frequency. Consequently, thermal radiation of the switching element 7 as well as the transformer 14 is improved, and further downsizing is enabled. Also, since the connector or the like is not included between the switching element 7 and the transformer 14, the parasitic inductance and the parasitic capacity may be decreased, which is advantageous for increasing the frequency.

Configurations and effects in the third embodiment other than those described above are the same as those in the second embodiment, and a circuit configuration of a switching power supply apparatus 3b is also the same as that of the switching power supply apparatus 3.

A magnetic shield may be provided by providing a ferromagnetic layer surrounding the transformer 14. The inductor 12, the feedback winding 13 may be formed in two layers. The inductor 12 and the feedback winding 13 which constitute the transformer 14 may be formed on the same plane on the insulating substrate 28 or may be laminated one on top of another.

Figure 6:
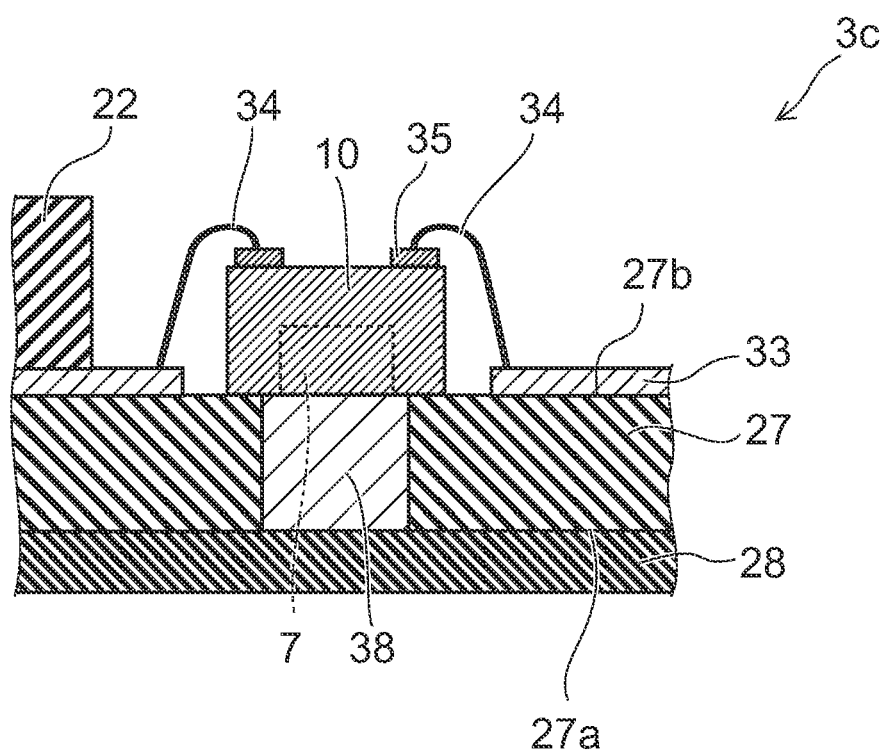
FIG. 6 is a cross-sectional view illustrating a switching power supply apparatus according to a fourth embodiment.

FIG. 6 is a cross-sectional view illustrating the switching power supply apparatus according to a fourth embodiment.

As indicated in FIG. 6, the fourth embodiment is different from the second embodiment in that the semiconductor element 10 is thermally connected to the insulating substrate 28 via a thermal conductor 38. In other words, thermal conductor 38 is provided so as to be penetrated through the mounting substrate 27, and is thermally connected to the semiconductor element 10 and the insulating substrate 28. The thermal conductor 38 is, for example, a metal containing at least one of copper (Cu) and aluminum (Al).

In the fourth embodiment, since the opening portion 37 is not provided on the mounting substrate 27, further downsizing is enabled.

Configurations and effects in the fourth embodiment other than those described above are the same as those in the second embodiment, and a circuit configuration of a switching power supply apparatus 3 is also the same as the switching power supply apparatus 3.

Figure 7A:
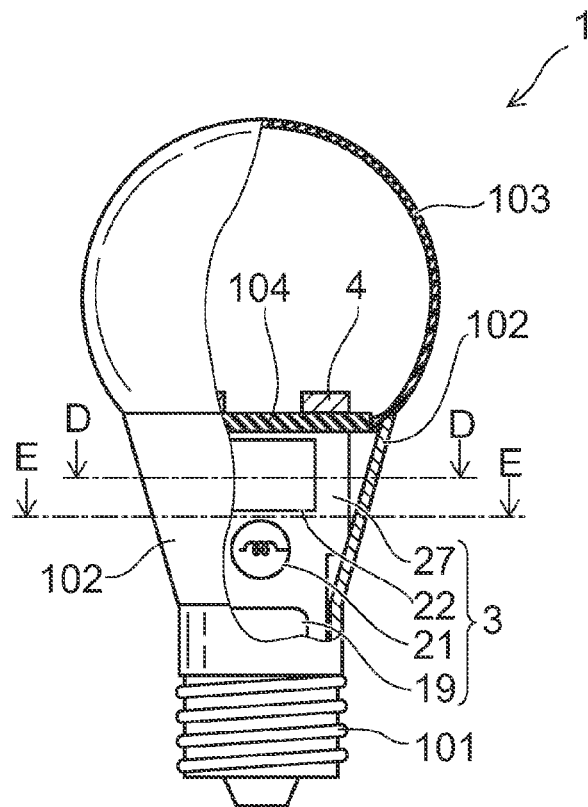
FIG. 7A is a partly cross-sectional front view illustrating a luminaire including a switching power supply apparatus.
Figure 7B:
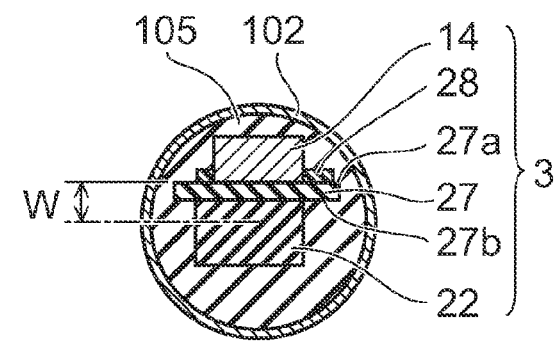
FIG. 7B is a partly cross-sectional view taken along the line D-D in FIG. 7A.
Figure 7C:
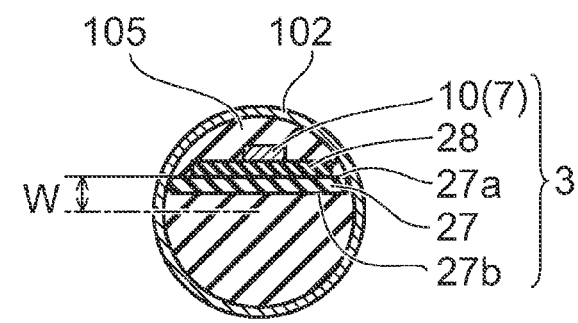
FIG. 7C is a partly cross-sectional view taken along the line E-E in FIG. 7A.

FIG. 7A is a partly cross-sectional front view illustrating the luminaire including a switching power supply apparatus, FIG. 7B is a partly cross-sectional view taken along the line D-D in FIG. 7A, and FIG. 7C is a partly cross-sectional view taken along the line E-E in FIG. 7A.

As illustrated in FIGS. 7A to 7C, the luminaire 1 includes a base 101, a housing 102, a translucent shield 103, a lighting substrate 104, and the switching power supply apparatus 3. The base 101, the housing 102, and the translucent shield 103 are formed into a bulb shape.

The switching power supply apparatus 3 is the same as the switching power supply apparatus 3 illustrated in FIG. 1A to FIG. 3, and the insulating substrate 28 is provided on the side of the first main surface 27a of the mounting substrate 27. The semiconductor element 10 having the switching element 7 integrated therein is thermally connected to the insulating substrate 28. Elements being relatively small and low in height such as the transformer 14 including the inductor 12 and the feedback winding 13 are provided on the side of the first main surface 27a of the mounting substrate 27. Relatively large and high element such as the input capacitance 19, the choke coil 21, and the smoothing capacitor 22 are provided on the side of the second main surface 27b, which is opposite the first main surface 27a of the mounting substrate 27. In order to make FIGS. 7A to 7C comprehensive, illustration is simplified by omitting the mounting substrate (child substrate) 29 and the like.

The switching power supply apparatus 3 is provided in such a manner that the second main surface 27b of the mounting substrate 27 is parallel to an imaginary center axis of the housing 102 and is offset from the center axis to the outside by a distance W. An insulating member 105 having high thermal conductivity is embedded in the interior of the housing 102, so that the switching power supply apparatus 3 is fixed and the insulating substrate 28 is thermally connected to the housing 102. The insulating member 105 is, for example, silicone.

The base 101 accommodates part of the switching power supply apparatus 3, and connects the pair of the input terminals 23 and 24 of the switching power supply apparatus 3 to the AC power supply.

The housing 102 is formed of a metal containing, for example, aluminum (Al), and accommodates the switching power supply apparatus 3, and the lighting substrate 104 provided on the switching power supply apparatus 3.

The translucent shield 103 diffuses and transmits light radiated from the lighting source 4 provided on the lighting substrate 104, and protects the lighting substrate 104.

In the fourth embodiment, since the switching element 7 is thermally connected to the insulating substrate 28 having thermal conductivity higher than the mounting substrate 27 and is thermally connected to the housing 102 via the insulating member 105, thermal radiation is improved. Consequently, downsizing of the luminaire 1 is enabled.

In the fourth embodiment, since the switching power supply apparatus 3 is downsized, the length of the housing 102 may be reduced and the translucent shield may be upsized. Consequently, light distribution may further be widened, and light output from a center portion of the translucent shield 103 toward the base 101 may be increased.

Furthermore, in the fourth embodiment, since the second main surface 27b of the mounting substrate 27 is offset from the center axis of the housing 102 by a distance W, relatively large and high elements such as the smoothing capacitor 22 may be mounted easily, and further downsizing is enabled.

Figure 8A:
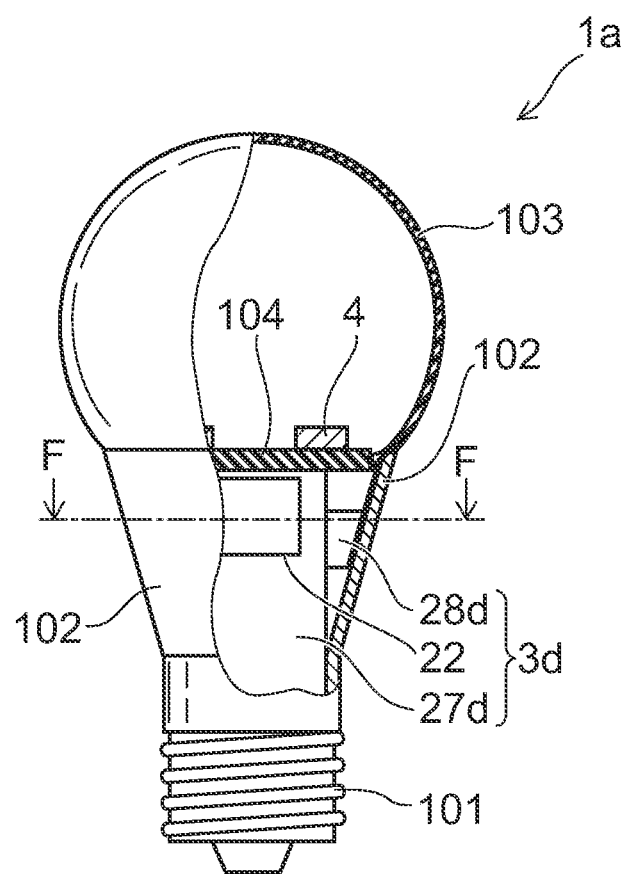
FIG. 8A is another partly cross-sectional front view illustrating a luminaire.
Figure 8B:
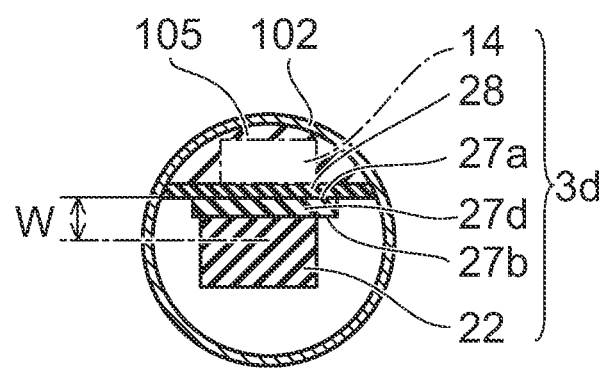
FIG. 8B is a partly cross-sectional view taken along the line F-F in FIG. 8A.

FIG. 8A is another partly cross-sectional front view illustrating a luminaire and FIG. 8B is a partly cross-sectional view taken along the line F-F in FIG. 8A.

As illustrated in FIGS. 8A and 8B, a luminaire 1a is different from the luminaire 1 in the configuration of the switching power supply apparatus 3. In other words, in the luminaire 1a, the switching power supply apparatus 3 in the luminaire 1 is replaced by a switching power supply apparatus 3d.

The switching power supply apparatus 3d is different from the switching power supply apparatus 3 in the shapes of the mounting substrate 27 and the insulating substrate 28. In other words, in the switching power supply apparatus 3d the planer shape of, a mounting substrate 27d is formed into a rectangular shape and the planar shape of an insulating substrate 28d is formed so as to come into contact with the housing 102. Consequently, thermal radiation of the switching element 7 to the housing 102 is improved. In addition, since the interior of the housing 102 is divided by the insulating substrate 28d, when filling the insulating member 105 only on the side of the first main surface 27a of the mounting substrate, the amount of filling may be reduced. The insulating member 105 may be filled on both of the first main surface 27a side and the second main surface 27b side of the interior of the housing 102 divided by the insulating substrate 28d.

Figure 9:
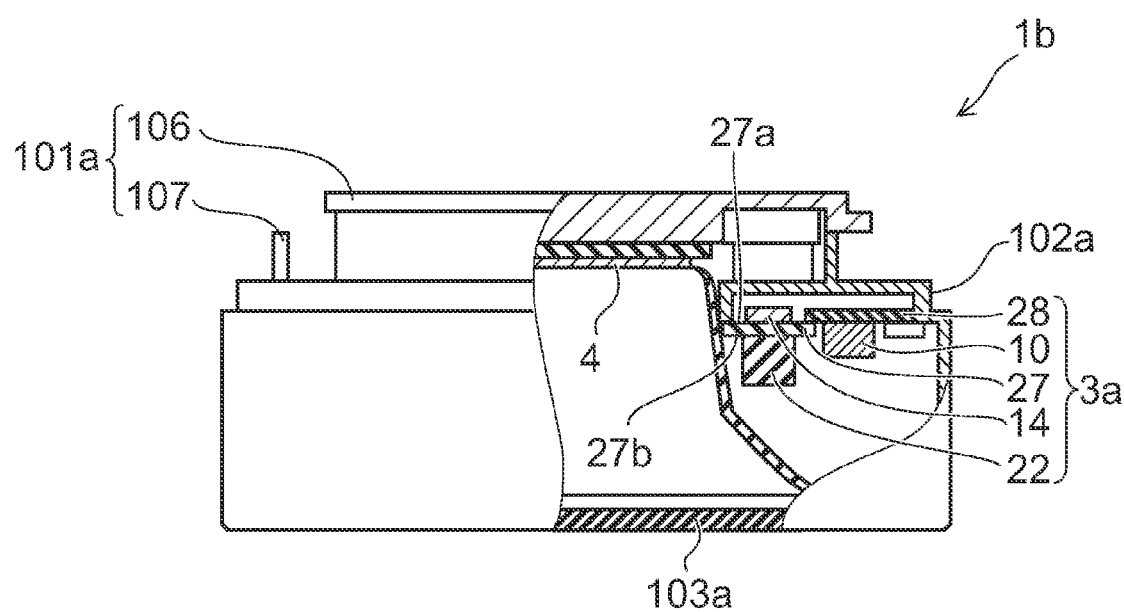
FIG. 9 is another partly cross-sectional view illustrating a luminaire.

FIG. 9 is another partial cross-sectional view illustrating a luminaire.

As illustrated in FIG. 9, a luminaire 1b includes a base 101a, a housing 102a, a translucent shield 103a, the lighting source 4, and the switching power supply apparatus 3a. The base 101a, the housing 102a, and the translucent shield 103a are formed into a cylindrical shape.

The switching power supply apparatus 3a is the same as the switching power supply apparatus 3a illustrated in FIG. 4, and the insulating substrate 28 is provided on the side of the first main surface 27a of the annular-shaped mounting substrate 27. The semiconductor element 10 having the switching element 7 integrated therein is thermally connected to the insulating substrate 28. Elements being relatively small and low in height such as the transformer 14 including the inductor 12 and the feedback winding 13 are provided on the side of the first main surface 27a of the mounting substrate 27. Relatively large and high element such as the input capacitance 19, the choke coil 21, and the smoothing capacitor 22 are provided on the side of the second main surface 27b, which is opposite the first main surface 27a of the mounting substrate 27. In FIG. 9, in order to make the drawing comprehensive, illustration is simplified by omitting elements other than the smoothing capacitor 22 on the second main surface 27b side.

The switching power supply apparatus 3a is provided in such a manner that the second main surface 27b of the mounting substrate 27 is perpendicular to an imaginary center axis of the housing 102a. The insulating member 105 having high thermal conductivity may be embedded in the interior of the housing 102a. The insulating substrate 28 may be thermally connected to the housing 102a. The insulating substrate 28 may be thermally connected to the housing 102a via the insulating member 105. The insulating member 105 is, for example, silicone.

The base 101a includes a cap portion 106 formed into a disk shape using a metal containing, for example, aluminum (Al) and a conductor 107. The cap portion 106 is provided on an upper portion of the housing 102a, and is thermally connected to the thermal radiating member provided on a luminaire body (not shown). A plurality of the conductors 107 are provided on the upper portion of the housing 102a, and connect the pair of input terminals 23 and 24 of the switching power supply apparatus 3a to the AC power supply via the luminaire body.

The housing 102a is formed of a metal containing, for example, aluminum (Al), and accommodates the switching power supply apparatus 3a in the peripheral portion and the lighting source 4 in the center portion. The lighting source 4 is thermally connected to the cap portion 106. the lighting source 4 is turned ON by receiving a supply of power from the switching power supply apparatus 3a as the lighting load 2 of the switching power supply apparatus 3a.

The translucent shield 103a is formed into a disk shape, and is provided on the lower portion of the housing 102a, that is, on the side opposite the base 101a of the housing 102a so as to cover the lighting source 4. The translucent shield 103a transmits light radiated from the lighting source 4, and protects the lighting source 4.

In this embodiment as well, since the switching element 7 is thermally connected to the insulating substrate 28 having thermal conductivity higher than the mounting substrate 27 and further is thermally connected to the housing 102a together with the insulating member 4, the thermal radiation is improved. Consequently, downsizing is enabled while increasing the light output of the luminaire 1b.

Although the embodiments have been described with reference to the detailed examples, the configurations are not limited to the embodiments, and various modifications are applicable.

For example, the configuration of the DC-DC converter in the switching power supply apparatus is not limited to the configuration illustrated in FIG. 3. Any other suitable configuration may be applied as long as the DC voltage may be lowered.

The switching element 7 and the constant-current element are not limited to GaN system HEMT. For example, a semiconductor element formed by using a semiconductor (wide band gap semiconductor) having a wide band gap such as Silicon Carbide (SiC), Gallium nitride (GaN), or diamond on a semiconductor substrate is also applicable. Here, the wide band gap semiconductor means a semiconductor having a wider band gap than gallium arsenide (GaAs) having a band gap of approximately 1.4 eV. Included are, for example, a semiconductor having a band gap of 1.5 eV or larger, gallium phosphide (GaP, a band gap of approximately 2.3 eV), gallium nitride (GaN, a band gap of approximately 3.4 eV), diamond (C, a band gap of approximately 5.27 eV), aluminum nitride (AlN, a band bap of approximately 5.9 eV), and silicon carbide (SiC). When equalization of the pressure resistances is wanted, such a wide band gap semiconductor element achieves a higher switching frequency, and hence achieves downsizing of winding components such as the inductor or capacitors since a parasitic capacitance is small because the size may be reduced in comparison with the silicon semiconductor element and hence the high-speed operation is enabled.

The lighting source 4 is not limited to the LED, and an OLED is also applicable. A plurality of the lighting sources 4 may be connected in series or in parallel to the lighting load 2.

Although several embodiments and the examples of the invention have been described, these embodiments or the examples are presented as examples and are not intended to limit the scope of the invention. These novel embodiments or the examples may be implemented in other various modes, and various omissions, replacements, and modifications may be made without departing the scope of the invention. The embodiments or examples and the modifications are included in the scope and gist of the invention, and are included in a scope equivalent to the invention described in Claims.

What is claimed is:

1. A switching power supply apparatus comprising:
    a switching element connected between a power supply and a lighting load;
    an inductor connected in series to the switching element;
    a drive circuit configured to control the switching element and convert a voltage supplied from the power supply;
    a mounting substrate on which the drive circuit is mounted; and
    an insulating substrate thermally connected to the switching element, and having thermal conductivity higher than the mounting substrate, the insulating substrate being physically separate from the mounting substrate.

2. The apparatus according to claim 1, further comprising a smoothing capacitor provided on the mounting substrate on a second main surface on a side opposite to a first main surface on which the inductor is provided.

3. The apparatus according to claim 2, wherein the insulating substrate is provided on a side of the first main surface.

4. The apparatus according to claim 1, further comprising an AC-DC conversion circuit configured to convert an AC voltage supplied from the power supply to a DC voltage and including a smoothing capacitor provided on the mounting substrate on a second main surface on a side opposite to a first main surface on which the inductor is provided.

5. The apparatus according to claim 1, wherein the switching element is mounted on the insulating substrate.

6. The apparatus according to claim 1, wherein the switching element is mounted on the mounting substrate, and is thermally connected to the insulating substrate via an opening portion provided on the mounting substrate.

7. The apparatus according to claim 1, wherein the switching element is mounted on the mounting substrate, and is thermally connected to the insulating substrate via a conductor.

8. The apparatus according to claim 1, wherein the inductor is a spiral inductor provided on the insulating substrate.

9. The apparatus according to claim 8, further comprising a feedback winding provided on the insulating substrate and magnetically coupled to the inductor.

10. The apparatus according to claim 9, wherein the inductor and feedback winding are provided on an identical plane on the insulating substrate.

11. A luminaire comprising:
    a switching power supply apparatus;
    a lighting load connected as a load circuit of the switching power supply apparatus; and
    a housing configured to accommodate the switching power supply apparatus,
    the switching power supply apparatus including:
        a switching element connected between a power supply and a lighting load;
        an inductor connected in series to the switching element;
        a drive circuit configured to control the switching element and convert a voltage supplied from the power supply;
        a mounting substrate on which the drive circuit is mounted; and
        an insulating substrate thermally connected to the switching element, and having thermal conductivity higher than the mounting substrate, the insulating substrate being physically separate from the mounting substrate.

12. The luminaire according to claim 11, wherein the insulating substrate is thermally connected to the housing.

13. The luminaire according to claim 11, further comprising a smoothing capacitor provided on the mounting substrate on a second main surface on a side opposite to a first main surface on which the inductor is provided.

14. The luminaire according to claim 11, further comprising:
    an AC-DC conversion circuit configured to convert an AC voltage supplied from the power supply to a DC voltage and including a smoothing capacitor provided on the mounting substrate on a second main surface on a side opposite to a first main surface on which the inductor is provided.

15. The luminaire according to claim 14, wherein the insulating substrate is provided on the side of the first main surface.

16. The luminaire according to claim 11, wherein the switching element is mounted on the insulating substrate.

17. The luminaire according to claim 11, wherein the switching element is mounted on the mounting substrate, and is thermally connected to the insulating substrate via an opening portion provided on the mounting substrate.

18. The luminaire according to claim 11, wherein the switching element is mounted on the mounting substrate, and is thermally connected to the insulating substrate via a conductor.

19. The luminaire according to claim 11, wherein the inductor is a spiral inductor provided on the insulating substrate.

20. The luminaire according to claim 19, further comprising a feedback winding provided on the insulating substrate and magnetically coupled to the inductor.

* * * * *